2 Sheets—Sheet 1.
J. F. GLIDDEN & P. W. VAUGHAN.
Assignors to Washburn and Moen Manufacturing Co., and I. L. Ellwood.
BARBING FENCE-WIRE.
No. 7,566. Reissued March 20, 1877.
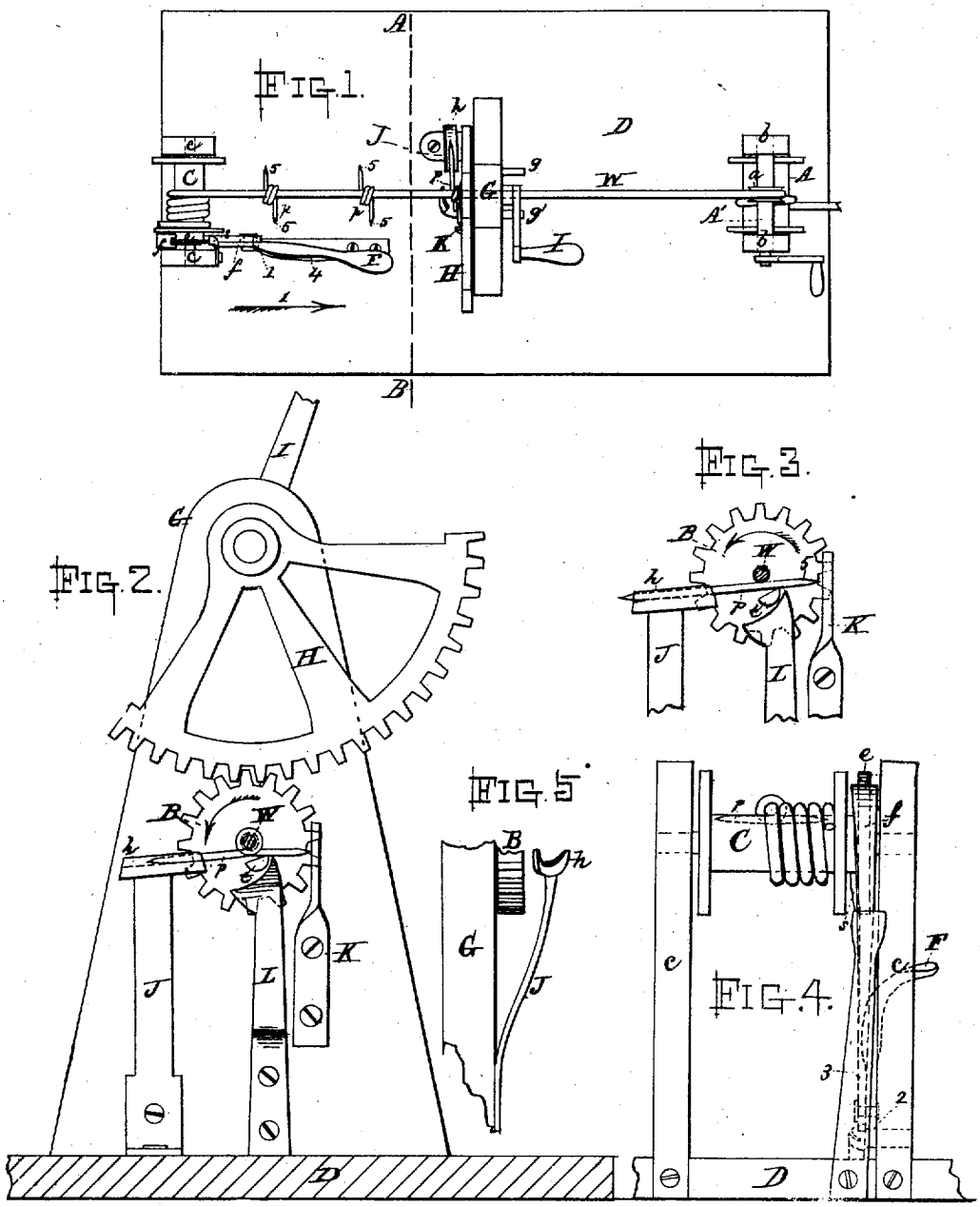
WITNESSES;
Earle A. Dick
G. W. Byington Jr.
INVENTORS;
Joseph F. Glidden & Phineas W. Vaughan
by Pollok & Bailey their attorneys 2 Sheets—Sheet 2.

J. F. GLIDDEN & P. W. VAUGHAN.

Assignors to Washburn and Moen Manufacturing Co., and I. L. Ellwood.

BARBING FENCE-WIRE.

No. 7,566. Reissued March 20, 1877.

WITNESSES;

Ewell A. Dick

Geo. F. Byington

INVENTORS;

Joseph F. Glidden & Phineas W. Vaughan by Pollok & Bailey their Attorneys.

UNITED STATES PATENT OFFICE.

JOSEPH F. GLIDDEN AND PHINEAS W. VAUGHAN, OF DE KALB, ILLINOIS, ASSIGNORS TO WASHBURN & MOEN MANUFACTURING COMPANY, OF WORCESTER, MASSACHUSETTS, AND ISAAC L. ELLWOOD, OF DE KALB, ILLINOIS.

IMPROVEMENT IN BARBING FENCE-WIRES.

Specification forming part of Letters Patent No. 157,508, dated December 8, 1874; reissue No. 7,566, dated March 20, 1877; application filed January 11, 1877.

*To all whom it may concern:*

Be it known that we, JOSEPH F. GLIDDEN and PHINEAS W. VAUGHAN, both of De Kalb, in the county of De Kalb and State of Illinois, have invented new and valuable Improvements in a Machine for Barbing Fence-Wire; and we do hereby declare that the following is a full, clear, and exact description of the construction and operation of the same, reference being had to the accompanying drawings, and letters of reference marked thereon, making a part of this specification, and in which—

Figure 6:
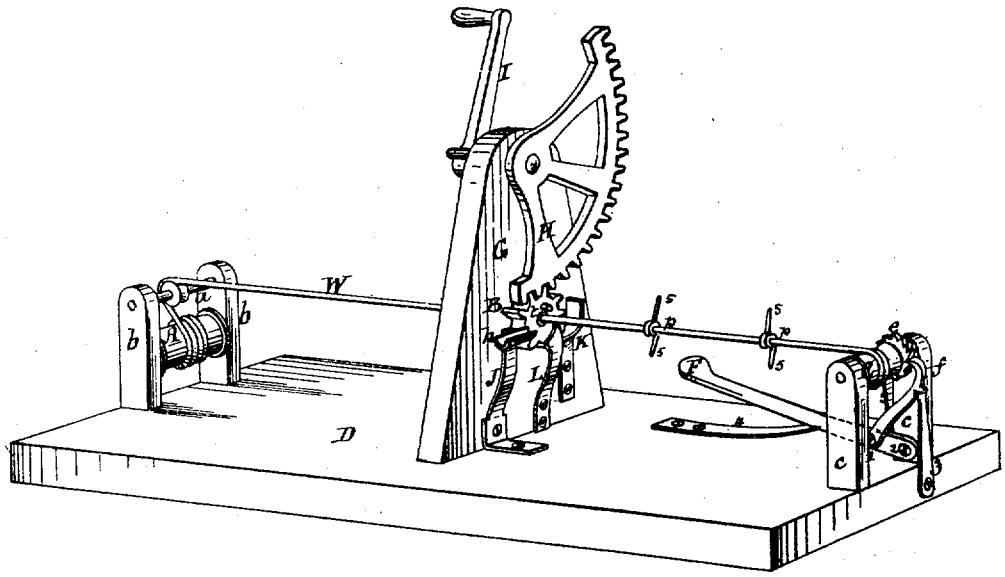
Figure 7:
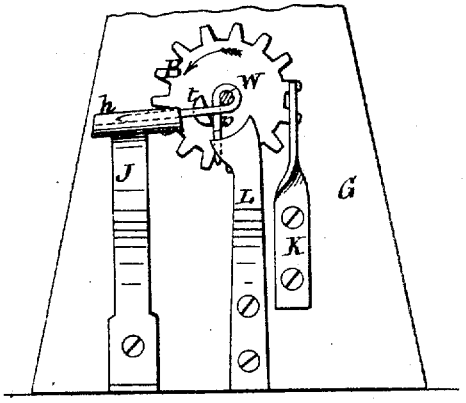

Figure 1 represents a top or plan view of our said machine. Fig. 2 represents, upon an enlarged scale, a section on line A B, Fig. 1, looking in the direction of arrow 1, same figure. Fig. 3 represents, also upon an enlarged scale, an end view of certain portions of our said machine, as will be hereafter more fully explained. Fig. 4 also represents upon an enlarged scale an end view of certain other portions of our said machine, as will be described more fully hereafter. Fig. 5 represents, upon an enlarged scale, a side view of a portion of the machine, representing the standard G, to which is secured the trough-like support or table *h*, as will be hereafter more fully described. Fig. 6 represents a perspective view of the whole machine, showing the several parts in their operative relation; and Fig. 7 is an end view of the machine, showing the parts in a position intermediate between those shown in Figs. 3 and 2, respectively.

To enable those skilled in the art to which our invention belongs to make and use the same, we will proceed to describe it more in detail.

Our invention is designed for facilitating the work of applying metal barbs to form fence-wires; and the nature of our invention consists, first, in the combination of two wire-supporting reels with barb-applying mechanism, as hereafter described; second, in the combination of mechanism for supporting the barb with mechanism for coiling the same around or upon the main fence-wire; third, the combination, in a machine or device for applying barbs to fence-wire, of a barb-support or guide-table with a twisting-lug, or device for coiling the barb-wire about the main fence-wire; fourth, the combination, in a machine or device for applying barbs to a fence-wire, of suitable guides or supports, both for the barb and main fence wire, with a twisting-lug, or equivalent device, for coiling the barb about or upon the fence-wire; fifth, the combination, with a machine or device for applying barbs to fence-wire, of a barb-coiling lug, arranged to rotate or move in the arc of a circle about the main fence-wire; sixth, the combination, in a machine or device for applying barbs to fence-wire, of a barb-supporting guide, stand, or table, and a stop or gage to limit the movement of the barb when placed in position preparatory to being coiled about or upon the main fence-wire; seventh, a device for applying barbs to fence-wire, fitted to receive and support the barb, and to wind it about the main wire by such pressure thereon as to cause the barb to clasp and gripe the main wire by a comparatively uniform compression thereon; eighth, the combination, in a device or machine for applying wire barbs to fence-wire, of an oblique guide or support for the barbs with the winding or coiling mechanism, to facilitate the barbing operation; ninth, the combination, in a machine or device for applying barbs to fence-wire, of a guide or keeper with the barb coiling or winding mechanism, to prevent the barb from slipping or escaping from the action of the barb wrapping or coiling mechanism or device; tenth, the combination, in a machine for barbing fence-wire, of the following elements, viz; first, two reels for properly supporting the main fence-wire; second, mechanism for winding the barbs about or upon the main wire, and arranged between the supporting-reels: and, third, straining and feeding mechanism for properly holding the fence-wire during the operation of applying the barbs thereto, and feeding it forward at suitable intervals, and winding the barbed wire upon its receiving reel or spool; eleventh, the nature of our said invention further consists in certain details of construction, which will be more fully described hereafter.

In the annexed drawings, the part marked A is a reel or spool, upon which the plain fence-wire is first coiled preparatory to its being stretched or strained to receive the barbs.

The journals of reel A and those of the shaft A′ are supported in suitable standards or bearing-pieces *b b*, secured to any proper framing or base.

The fence-wire W passes from reel A up over a grooved pulley, *a*, on shaft A′; thence in a horizontal direction through the tubular shaft of pinion B, and thence forward, and is wound upon a reel or spool, C, whose journals are supported in suitable bearings in the standards *c c*, the latter being secured to any proper framing or base-piece.

On the shaft of reel C is keyed or secured a ratchet-wheel, *e*, which can be rotated intermittingly by means of a claw-pawl pivoted at 1 on a long treadle, F; treadle F being pivoted at 2 to the inside of one of the standards *c*.

Ratchet-wheel *e* is prevented from turning back by a catch or pawl spring, *s*, which takes into the ratchet-teeth on wheel *e*. A spring, 3, is secured to the base-piece which supports standards *c c*, so as to press against the back of claw-pawl *f*, and keep it always in contact with ratchet-wheel *e*, when treadle F and claw-pawl *f* are depressed. Another spring, 4, is secured so as to press against the under side of treadle F, for the purpose of raising said treadle and its claw-pawl *f* as soon as the foot or other power is removed therefrom, after they have been once depressed for the purpose of winding a portion of the wire W upon reel C.

The tubular shaft of pinion B has its bearing in a standard, G, rising, in this instance, from a base or foundation piece, D, arranged between the two wire-reels A and C.

The cogs of pinion B engage the cogs on a vibrating segment, H, on the shaft of which a crank-arm, I, is keyed, the shaft of segment H being secured in proper bearings in the standard G.

In this instance two stops, *g g′*, are secured to standard G, to limit the length of stroke given to the segment H in either direction.

J designates a standard, which carries a trough-shaped support or table, *h*, for receiving and supporting the double-pointed piece of barb-wire preparatory to its being coiled, wrapped, or applied to the main wire W, as shown more particularly in Figs. 5 and 6.

K designates a gage or stop, against which one end of a barb-wire is held or placed when first introduced into the machine to be wound upon the fence-wire, and L designates a spring keeper or guide, the upper curved end of which presses against the face of cog-wheel B, between the barb-support *h* and the gage K.

The operation is as follows: A piece of wire, *p*, of the proper length, and pointed at both ends, is adjusted or placed upon the support or table *h*, with one end against the gage K, as indicated in Fig. 3 of the drawings. When the barb-wire *p* is thus adjusted it will lie over or above the flat side of a twisting-lug, *t*, on the face of wheel B, as also indicated or shown in Fig. 3, which also shows the twisting-lug turned so as to come in contact with the barb-wire *p* as it appears when the twisting-lug commences to bend or coil the barb-wire about or upon the fence-wire. The segment H, being given one stroke, causes pinion-wheel B to rotate around the wire W, thereby winding the barb-wire about or upon the fence-wire W, as indicated in the drawings.

In this instance the adjustment of the throw of segment H is such as to coil the barb-wire twice around the fence-wire W, as indicated on the left-hand end of Fig. 1, and leaving the barbed ends 5 5 projecting out in opposite directions, but upon the same side of the main wire; but the machine may be so adjusted as to leave the barbed ends 5 5 projecting at different angles to each other, and it may also be so adjusted as to wrap or coil the barb-wire more or less about the main wire, as may be desired.

After one section of barb-wire has been applied to the main wire, the latter is then wound upon the reel C, by the mechanism before described, the distance it is desired to have the barbs stand apart, when another barb-wire, *p*, is applied to the main wire, and so on until the entire reel or spool of plain fence-wire is barbed, the barbs being set at regular intervals apart.

The table *h* is arranged, as before said, obliquely or at an angle with reference to the face of the twisting-wheel, so that the barb is presented to the action of the twisting-wheel in such a way as that the coils formed therein may be laterally contiguous, and the two ends of the barb pass without coming in contact with each other.

The end of the barb-wire which rests on the table is, by the operation of the twisting-wheel upon the other end, shortened and drawn off from the table until the coiling operation of the barb upon the main wire is completed, when the two barb ends will be of even length or projection from the main wire. During this operation the barb may have a tendency to slip off the twisting-pin. To prevent this is the office of the keeper or guide L, which is shaped and located so as to deflect or crowd the end of the barb which is carried around the main wire against the face of the wheel. To this end the guide is composed of a plate of triangular form, one end of which is turned inwardly against, while the other is flaring or turned away from, the face of the wheel.

What we claim as our invention, and desire to secure by Letters Patent, is—

1. The combination of two wire-supporting reels, at suitable distances apart for properly supporting the wire to be barbed, with barb-applying mechanism between the reels, for barbing the wire as it is passed from one reel to the other.

2. The combination of mechanism for properly supporting the barb with mechanism for coiling or winding the same around or upon the main fence-wire.

3. The combination, in a machine or device for applying barbs to fence-wire, of a barb-support or guide-table with a twisting-lug, or device for winding or coiling the barb-wire about the main fence-wire.

4. The combination, in a machine or device for applying barbs to fence-wire, of suitable guides or supports, both for the barb and main fence wire, with a twisting-lug for winding or coiling the barb about or upon the fence-wire.

5. The combination, with a machine or device for applying barbs to fence-wire, of a barb-coiling or winding lug, arranged to rotate or move in the arc of a circle about the main fence-wire.

6. The combination, in a machine or device for applying barbs to fence-wire, of a barb-supporting guide, stand, or receiver, and a stop or gage to limit the movement of the barb when placed in position preparatory to being coiled or wound about or upon the main fence-wire.

7. A device or mechanism for applying barbs to fence-wire, fitted to receive and support the barb, and mechanism for winding the barb-wire about the main wire by such pressure thereon as to cause the barb to clasp and gripe the main wire by a comparatively uniform compression thereon.

8. The combination, in a device or machine for applying wire barbs to fence-wire, of a guide or support for the barbs, arranged at an obtuse angle with the main fence-wire, with a winding or coiling mechanism, to facilitate the barbing operation.

9. The combination, in a machine or device for applying barbs to fence-wire, of a keeper with the barb-coiling mechanism, to prevent the barb from slipping or escaping from the action of the barb-coiling mechanism or device.

10. The combination, in a machine for barbing fence-wire, of the following elements, viz: first, two reels for properly supporting the main fence-wire; second, mechanism for wrapping or compressing the barbs about or upon the main wire, and arranged between the supporting-reels; and, third, straining and feeding mechanism, all for properly holding the fence-wire during the operation of applying the barbs thereto, and feeding it forward at suitable intervals, and winding the barbed wire upon its receiving reel or spool.

11. The combination, with the pinion W and barb-support *h*, of the twisting-lug *t* and segment H, for the purposes set forth.

12. The combination, with segment H and pinion B, of the stops *g g'*, lug *t*, stop K, and keeper or guide L, substantially as and for the purposes set forth.

JOSEPH F. GLIDDEN.
PHINEAS W. VAUGHAN.

Witnesses:
E. C. LOTT,
CHARLES E. BEAUPRE.